Jan. 23, 1934.　　A. G. SATSKY ET AL　　1,944,847
MANURE DISTRIBUTOR
Filed March 5, 1932
Fig. 1.
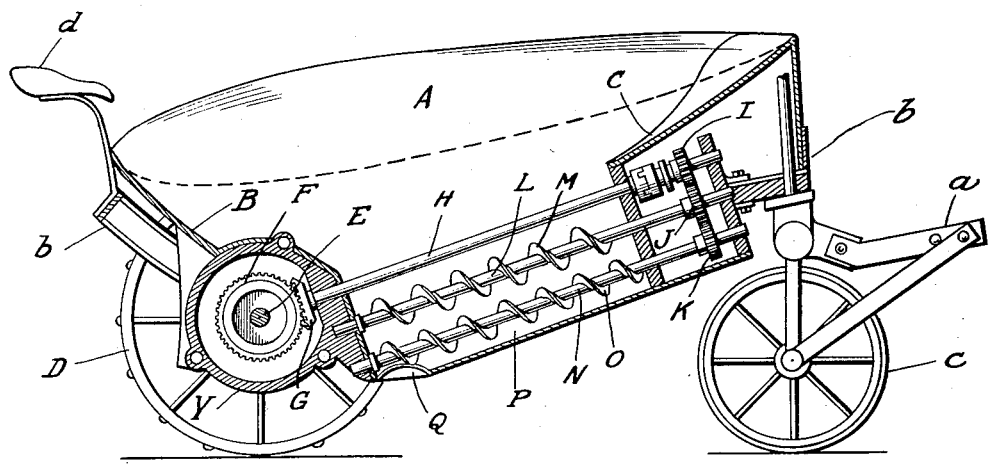
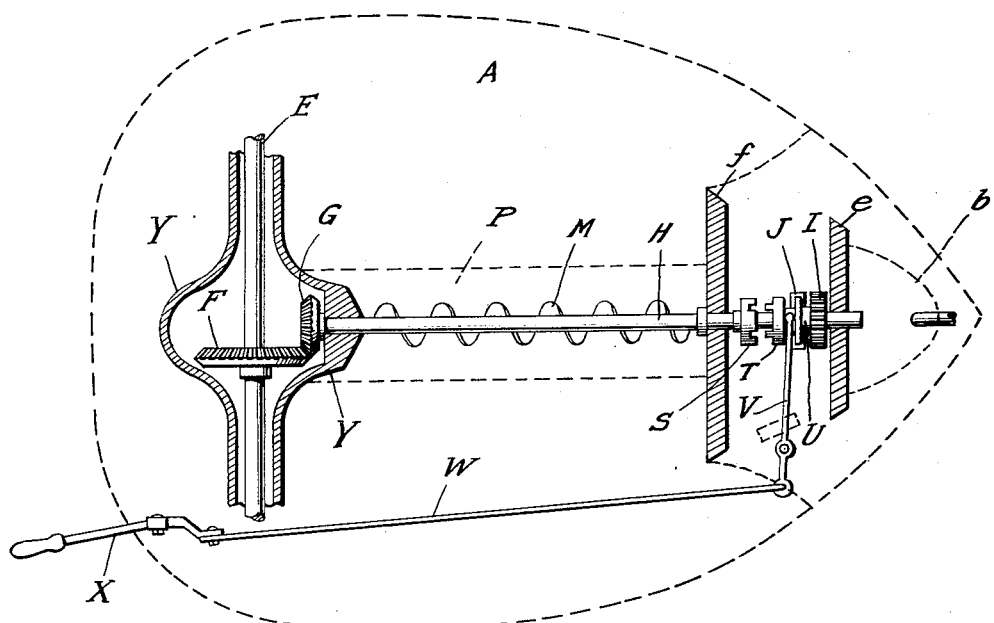
Fig. 2.
INVENTORS:
Anthony G. Satsky
Paul Lastovica Patented Jan. 23, 1934

1,944,847

UNITED STATES PATENT OFFICE 1,944,847

MANURE DISTRIBUTOR

Anthone G. Satsky, Smithville, and Paul Lastovica, Flatonia, Tex.

Application March 5, 1932. Serial No. 598,986

1 Claim. (Cl. 275—7)

The invention relates to improvements in transferring and distributing stable, barnyard and cowlot manure, and all other kinds of fertilizers in which the manure is broken up and deposited within the seed-bed or furrow, or at any linear proximity to the same, with a minimum of handling and in a minimum of time.

The improvement consists of a conical-shaped steel container built inside a steel chassis, supported upon a revolving axle through which power is transmitted; spiral shafts or worm blades wound on steel shafts arranged one above the other which revolve in opposite directions, the upper shaft propelling the fertilizer forward, the lower one backward to point of distribution in the vortex in the bottom of container.

The object is to provide a novel means of carrying, breaking up and discharging it within the furrow exactly where desired, with no other manual labor than loading it into the hopper at the stalls or cowlot. Also it provides a vehicle light of operation and light of movement from place to place, and adjustable to different row widths.

With the foregoing and other objects in view the invention consists of details of construction and in arrangement of parts to be hereinafter more fully described and claimed.

In the following description reference will be had to the accompanying drawing, forming part of this specification, wherein like characters denote corresponding parts in the several views, in which—

Fig. 1 is a longitudinal, sectional view of the machine; the inner side walls of the hopper or container, A, the rear inner wall, B, and the front wall, C, all of which slope toward the semi-cylindrical bottom, P, thus utilizing gravity to aid in bringing the contents to the point of distribution, Q.

The chassis is mounted on wheels, c, and D, of which there are three, one in front and two in the rear, those in the rear keyed to the axle shaft, E, providing power by the use of ordinary bevel gears, F and G, and the revolving shaft, H, which runs to the front of the machine where it is supplied with gears, I, J and K, which operate to turn shafts L and N, upon both of which are wound worm blades, M and O. These blades revolve in opposite directions, the upper one, L, operating to move the material forward, the lower one, N, to carry it backward along the semi-cylindrical, sloping bottom, P, to the point of discharge, Q, the spiral flanges or worm blades on these shafts serving to break up and pulverize the material as well as to discharge it. These shafts are mounted at the rear in the heavy steel housing, Y, Fig. 1 and Fig. 2, enclosing the driving gears; extended and made stronger as a mounting for these shafts; in front in equally strong steel mounting (f and e, Fig. 2), which form an extension of the steel chassis.

Fig. 2 is a plan view showing the relative size of the axle shaft, E, as well as the rugged steel housing, Y, the bevel gears F and G, the semi-cylindrical, trough-like bottom, P; the clutch system, R and Z, and the lever, V, W, X, by which the clutch is released or the machine thrown in or out of gear by the driver from the seat, d, (Fig. 1).

The distributor, with its load of manure, may be drawn by means of horses, attaching a tongue to it at a, Fig. 1, or by a tractor or passenger car, connection being made at the same point (a, Fig. 1).

We are adopting universally used mechanical combinations for power, gear shift, with adjustment and other necessary processes, and do not, therefore, claim any new ideas in these things, save, perhaps, adaptation. We are not aware of the existence of any machine for taking rough, compact stable manure or cowlot manure, just as it comes from the stable or lot, and depositing it in a pulverized condition, just as it must be, exactly where the farmer or truckman wants it.

Having, as we believe, sufficiently described our invention, and the mechanical combinations and adaptations which we pray to be secured by Letters Patent,

We claim:—

The combination in a manure spreader, of a sheet steel hopper-like container mounted on a frame having front and rear wheels, said container having sloping sides and a semi-cylindrical bottom inclined downwardly to the rear and provided with a discharge opening, two parallel shafts wound with worm blades and one above the other mounted adjacent the bottom of said container, an axle on which said rear wheels are mounted, gear means on said axle, a drive shaft geared thereto and other gear means on said drive shaft and on said parallel shafts so arranged that the parallel shafts may be rotated in opposite directions, whereby manure in said container may be pulverized and fed toward said discharge opening.

ANTHONE G. SATSKY.
PAUL LASTOVICA.